July 23, 1968   H. M. DE VANE   3,393,464
ADJUSTABLE SIGN FOR AUTOMOTIVE VEHICLE DOORS
Filed Sept. 1, 1966
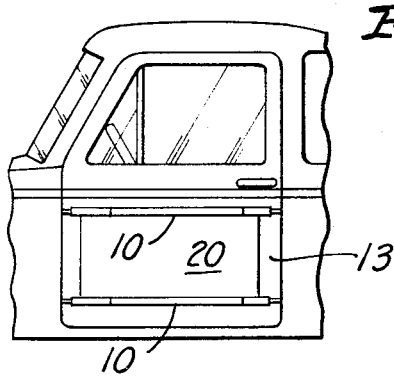
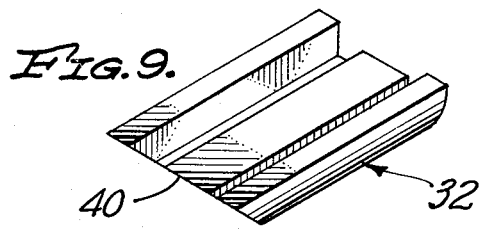
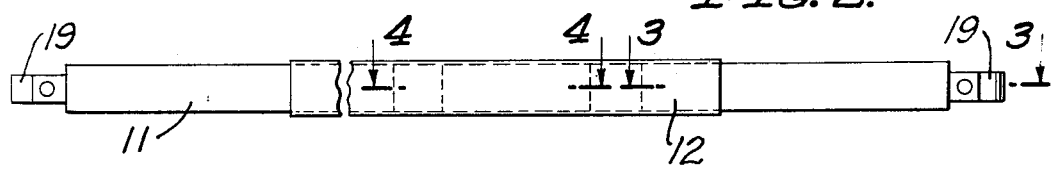
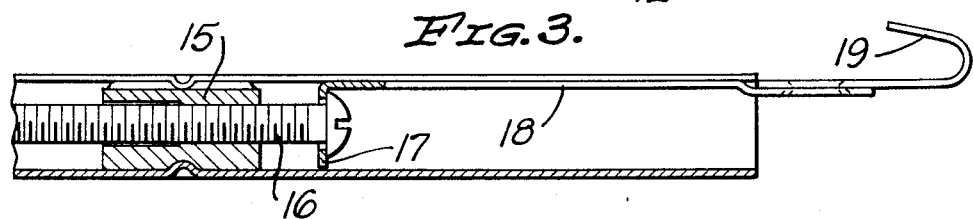
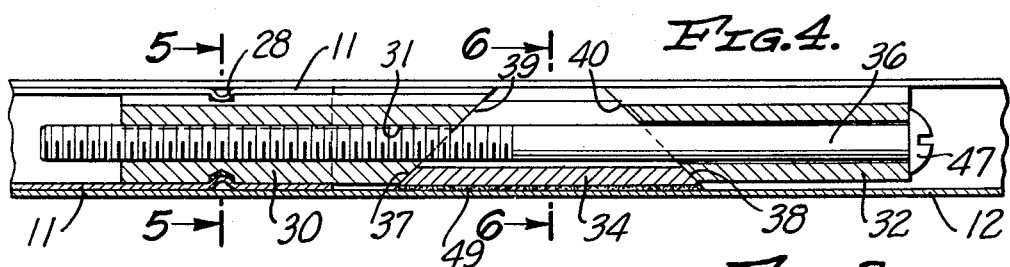
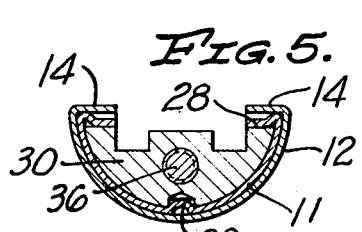
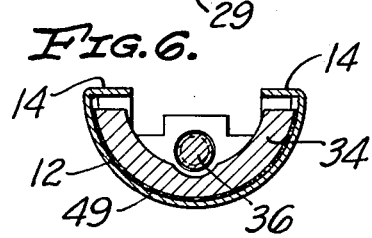
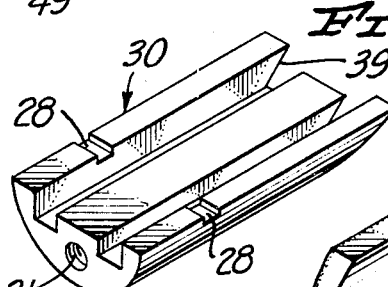
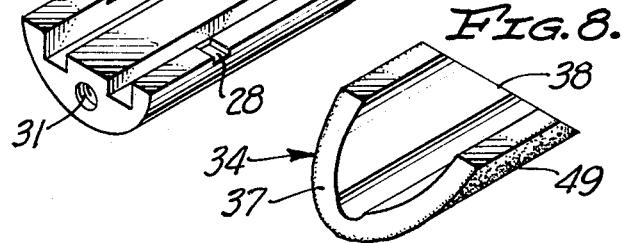
INVENTOR
HARRY M. DE VANE
BY Robert C. Comstock
ATTORNEY & 3,393,464
Patented July 23, 1968

3,393,464
ADJUSTABLE SIGN FOR AUTOMOTIVE
VEHICLE DOORS
Harry M. De Vane, 1549 Pine St.,
Oxnard, Calif. 93030
Filed Sept. 1, 1966, Ser. No. 576,705
8 Claims. (Cl. 40—129)

ABSTRACT OF THE DISCLOSURE

A sign assembly to be mounted on the door of a vehicle and including two parallel rails between which the sign is mounted and with each of the rails comprising two telescoping units to enable the sign to be mounted on vehicle doors of various widths.

---

This invention relates to an adjustable sign for automotive vehicle doors. The present invention is an improvement upon a removable sign of the type shown in my Patent No. 3,255,542 issued June 14, 1966.

It has been found difficult to make a single sign structure which is universal in the sense that it will fit substantially all automotive vehicle doors because such doors vary in width over a substantial range.

It is primarily the object of the present invention to provide a sign structure and particularly a track type of device which is adjustable as to length, so that it can easily be adjusted to fit various widths of vehicle doors.

Another object of my invention is to provide such a device in which the track can be fixedly held at any desired length to which it is adjusted. It is accordingly necessary for the user to make only a single adjustment for use of the sign on any given vehicle.

A further object of the invention is to provide a device of the type described in which the adjusting mechanism does not interfere in any way with the sign holding and vehicle holding mechanisms and functions.

It is also among the objects of my invention to provide such a device which is simple and economical to manufacture and simple to install, so that it is capable of widespread sale and use.

My invention also comprises such other objects, advantages and capabilities as will later more fully appear and which are inherently possessed by my invention.

While I have shown in the accomanying drawings a preferred embodiment of my invention, it should be understood that the same is susceptible of modification and change without departing from the spirit of my invention.

Referring to the drawings:

FIG. 1 is an elevational view on a reduced scale showing my adjustable sign in use on an automotive vehicle door;

FIG. 2 is a front elevational view of one of the tracks;

FIG. 3 is a sectional view taken along line 3—3 of FIG. 2, showing the hook structure which attaches the track to the door;

FIG. 4 is a sectional view taken along line 3—3 of FIG. 2, showing the locking structure which prevents longitudinal sliding movement of the track sections relative to each other;

FIG. 5 is a sectional view taken along line 5—5 of FIG. 4 showing fixed block within the track;

FIG. 6 is a sectional view taken along line 6—6 of FIG. 4, showing the cam block within the track;

FIG. 7 is an isometric view of the fixed block;

FIG. 8 is an isometric view of the cam block;

FIG. 9 is an isometric view of the movable block.

A preferred embodiment which has been selected to illustrate my invention comprises a pair of identically formed elongated tracks 10, which may conveniently be formed of metal. Each of the tracks 10 actually comprises a pair of slidably mounted telescoping inner and outer track sections 11 and 12 respectively.

The tracks 10 are adapted to be mounted so that they extend horizontally across an automotive vehicle door 13, with one track 10 being disposed along the lower part of the door 13, and the other track 10 being disposed a substantial distance thereabove. Each of the tracks 10 preferably has a semi-circular or raised shape and is provided along the portion which fits against the vehicle door 13 with a pair of flanges 14, which face inwardly toward each other.

Refering to FIG. 3 of the drawings, the outer end of each of the track sections 11 and 12 is provided with a stationary member 15, through which the inner end of a screw 16 is threaded. The head of the screw 16 engages the right angular inner end 17 of a slide member 18. The outer end of the slide member 18 carries a pivotally mounted hook 19 which engages and fits around the edge of the vehicle door 13, to hold the track 10 in place on the door 13.

A rectangular sign plate 20, is preferably formed of somewhat flexible material such as sheet metal or plastic sheet material which is sufficiently flexible so that it is capable of being bent slightly in order to follow the contour of the door, which may be curved or bulged. The sign plate 20 is provided along its upper and lower edges with a pair of right angular top and bottom flanges which extend along the entire length of the sign plate 20. The flanges of the sign plate 20 extend into the hollow inside portions of the tracks 10 and transversely engage the edge of one of the flanges 14 of each of the tracks 10 to hold the sign plate 20 in a position susbtantially parallel to and substantially flat against the vehicle door 13.

The tracks 10 should preferably have a slight degree of resilience or flexibility, so that they will bend slightly in use in order to follow a slight degree of curvature in the vehicle door.

A fixed block 30 is permanently mounted adjacent the inwardly disposed end of the inner track section 11 and extends substantially beyond the end of the track section 11. In the embodiment shown, the fixed block 30 is provided with a pair of grooves 28 and the adjacent portions of the flanges 14 of the track 10 are struck or deformed into the grooves 28. The opposite side of the fixed block 30 is also provided with a centrally disposed opening 29 into which the adjacent portion of the rounded front of the track section 11 is struck or deformed. The fixed block 30 is thus held against longitudinal movement with respect to the inner track section 11. The fixed block 30 is provided with a screw threaded bore 31 which extends completely through the fixed block 30 substantially along its longitudinal axis.

A movable block 32 is freely mounted within the outer track section 12 and spaced a short distance from the fixed block 30. The movable block 32 has a bore 33 extending completely therethrough substantially along its longitudinal axis.

An arcuate cam block 34 is freely mounted within the outer track section 12 between the movable block 32 and the fixed block 30. The cam block 34 has a hollow interior which provides space for the shaft of an elongated screw threaded fastening member 36 which extends through the bore 33 and into or through the bore 31 of the blocks 30 and 32. The slotted head 47 of the fastening member 36 engages the straight end of the movable block 32 remote from the fixed block 30.

The cam block 34 is provided at its opposite ends with angularly directed cam surfaces 37 and 38. The adjacent ends of the fixed block 30 and movable block 32 are provided with complementary cam surfaces 39 and 40 respectively which slidably engage the cam surfaces 37 and 38 of the cam block 34.

The outer semi-circular surface of the cam block 34 is provided with a layer 49 with abrasive material or the like, or the surface may be otherwise roughened to provide increased frictional engagement when it contacts the rounded inside surface of the outer track section 12.

In use, the fastening member 36 must be loosened in order to permit sliding telescopic movement of the track sections 11 and 12 with respect to each other. When the length of the track 10 has been properly adjusted, the fastening member 36 is tightened. Its head 47 then exerts pressure on the movable block 32 urging its cam surface 40 into engagement with the adjacent cam surface 38 of the cam block 34. The cam block 34 is in turn urged toward the fixed block 30, bringing the cam surfaces 37 and 39 into engagement with each other.

As the fastening member 36 is tightened further, the movable block 32 continues to move toward the fixed block 30 and the engaging cam surfaces force sliding movement of the cam block 34 outwardly within the track section 10 to bring the abrasive layer 49 into tight engagement with the rounded inner surface of the track section 12. At the same time, the angularity of the engaging cam surfaces 38 and 40 forces the movable block 32 in the opposite direction, into engagement with the inner surfaces of the flanges 14 of the track section 12. Such movement is permitted by the bore 33, which is substantially larger in diameter than the shank of the fastening member 36, so that the movable block 32 is free to move to a limited degree transversely to the fastening member 36.

If some play is provided between the fixed block 30 and the track section 11, the end of the fixed block 30 which carries the cam surface 39 and which projects substantially beyond the end of the track section 11 may also be forced into engagement with the inner surface of the flanges 14 of the track section 12.

The frictional engagement of the blocks 30, 32 and 34 with the track section 12 prevent any longitudinal sliding movement of the track section 12 with respect to the track section 11 and the track 10 is thus held fixed in the proper length. The head 47 of the fastening member 36 is easily accessible through the open area of the track section 12 between the flanges 14 when the track 10 is removed from the vehicle door 13.

When the fastening member 36 is loosened, the blocks 30, 32 and 34 move out of engagement with the track section 12 and the track section 12 can then be freely moved with respect to the track section 11.

I claim:

1. In a removable sign for automotive vehicle doors, a pair of elongated tracks adapted to be mounted in parallel spaced horizontal relationship across the upper and lower portions respectively of a vehicle door, each of said tracks comprising a pair of telescopically mounted longitudinally slidable inner and outer track sections, means for adjusting the length of said tracks by selectively preventing the longitudinal sliding movement of said track sections with respect to each other, said means comprising at least two blocks mounted within each of said tracks, one of said blocks being disposed within one of said track sections and being longitudinally fixed with respect to said track section, the other of said blocks being unfixed and disposed within the other of said track sections, an angularly directed cam surface carried by each of said blocks, said cam surfaces being complementary, means for moving said unfixed block toward said fixed block to bring said cam surfaces into engagement with each other, the cam surface of said unfixed block being adapted to slidably move along the cam surface of said fixed block, to move said unfixed block transversely within said track into frictional engagement with the inside surface of the track section in which it is disposed, to prevent the longitudinal sliding movement of said track sections with respect to each other.

2. The structure described in claim 1, each of said blocks having a bore extending longitudinally therethrough, a fastening member extending through the bore in said unfixed block and screw threadedly into the bore in said fixed block, said fastening member having means engaging said unfixed block whereby when said fastening member is rotated, said unfixed block is urged toward said fixed block.

3. The structure described in claim 1, said track having three blocks mounted therein, said blocks comprising a fixed block, a movable block and a cam block disposed therebetween, said fixed block being disposed within one of said track sections and said movable block and cam block being disposed within the other of said track sections, said cam block having a pair of oppositely directed cam surfaces at its opposite ends, said movable block and fixed block having complementary cam surfaces disposed adjacent to the cam surfaces of said cam block, the cam surfaces of said blocks being adapted to slidably move along each other when said movable block is moved towards said fixed block, to move said cam block transversely into frictional engagement with one side of said track section in which it is mounted and to move said movable block transversely in the opposite direction into engagement with the opposite side of said track section, the engagement between said blocks and said track section preventing longitudinal movement of said track sections with respect to each other.

4. The structure described in claim 3, said fixed block having a screw threaded bore extending longitudinally therethrough, said movable block having an aligned bore extending longitudinally therethrough, a fastening member having means adjacent the head thereof engaging said movable block and a shank extending through the bore in said movable block into threaded engagement with the bore in said fixed block, said fastening member being adapted upon rotation thereof to bring said cam surfaces of said blocks into engagement with each other.

5. The structure described in claim 4, the track section in which said cam block is disposed having a substantially semi-circular front portion, and said cam block having an arcuate abrasive surface engageable with the adjacent inside surface of said semi-circular portion.

6. The structure described in claim 4, the track section in which said movable block is mounted having a pair of inwardly facing flanges adapted to extend substantially parallel to the vehicle door, said movable block frictionally engaging said flanges upon its transverse movement within said track section.

7. The structure described in claim 5, the track section in which said movable block is mounted having a pair of inwardly facing flanges adapted to extend substantially parallel to the vehicle door, said movable block frictionally engaging said flanges upon its transverse movement within said track section.

8. The structure described in claim 3, the track section in which said cam block is disposed having a substantially semi-circular front portion, said cam block having an arcuate abrasive surface engageable with the adjacent inside surface of said semi-circular portion, said track section also having a pair of inwardly facing flanges adapted to extend substantially parallel to the vehicle door, said movable block frictionally engaging said flanges upon its transverse movement within said track section.

References Cited

UNITED STATES PATENTS

| | | | |
|---|---|---|---|
| 2,214,302 | 9/1940 | Keller et al. | 40—129 |
| 3,255,542 | 6/1966 | De Vane | 40—129 |
| 3,298,542 | 1/1967 | Hansen | 40—129 |

EUGENE R. CAPOZIO, *Primary Examiner.*

W. J. CONTRERAS, *Assistant Examiner.*